Sept. 9, 1952 — A. HALLUM — 2,609,641
TORCH FOR HEATING WATERMELON HILLS
Filed Jan. 23, 1947
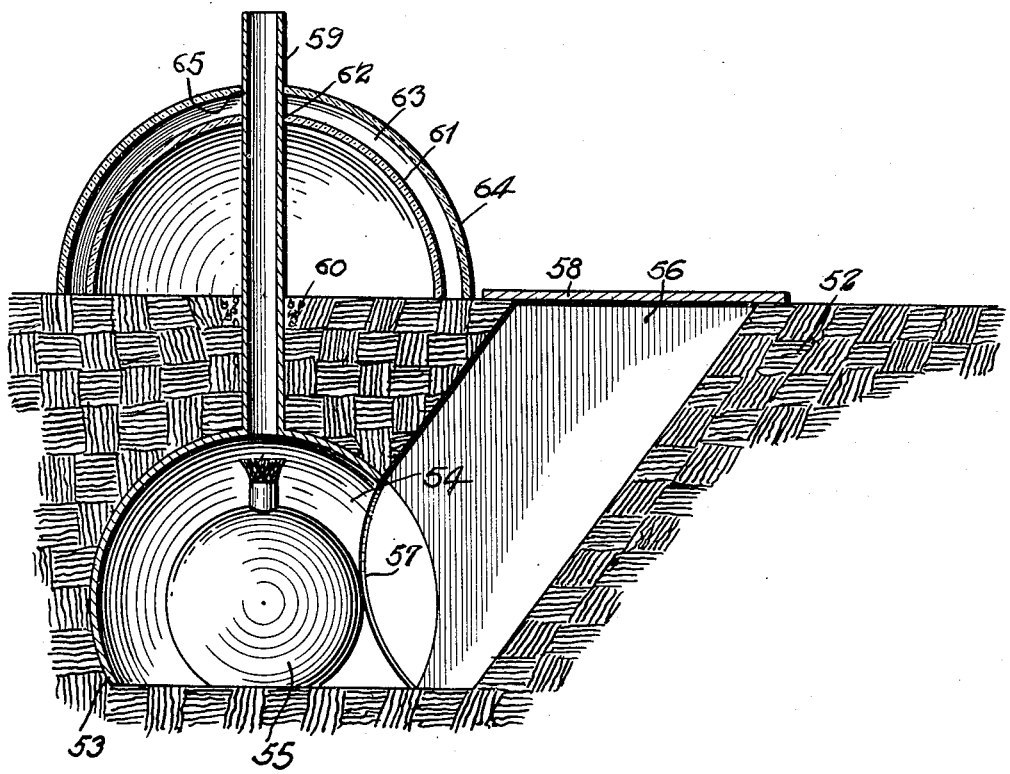
INVENTOR.
Andrew Hallum.
BY Victor J. Evans & Co.
ATTORNEYS Patented Sept. 9, 1952

2,609,641

UNITED STATES PATENT OFFICE 2,609,641

TORCH FOR HEATING WATERMELON HILLS

Andrew Hallum, Lanesboro, Minn.

Application January 23, 1947, Serial No. 723,775

1 Claim. (Cl. 47—19)

This invention relates to heating devices that are to be used for starting early melons, cucumbers, squash, pumpkins or other produce that has the germinating seeds thereof sown in a hill formed on the surface of the ground.

An object of the invention is to provide a heating device that is embedded in a hill in which the seeds are sown, that will prematurely heat the seeds and start them germinating regardless of the weather conditions prevailing.

With the above and other objects in view, the invention consists of the novel details of construction, arrangement and combination of parts more fully hereinafter described, claimed and illustrated in the accompanying drawing in which:

In the figure there is shown a preferred form of the invention.

Referring more in detail to the drawing a hole is excavated in the ground 52 and the spherical heating member 53 is buried in the ground, below the surface thereof. The member 53 forms the heating chamber 54 for the torch 55, and a hole 56 excavated from the surface downwardly to the member 53 permits a person to ignite or remove the torch for refueling, access being gained to the chamber 54 by means of the circular opening 57 in the member 53, and to prevent loss of heat from the chamber 54, a piece of wood or other material 58 may close the open end of the hole 56. Formed integral with the member 53 is a vertical outlet pipe 59, and this pipe passes near the seeds 60 in the ground. Placed over the seeds and resting on the ground is a semi-spherical glass cover or heat cap 61, which is apertured at 62 to permit the pipe 59 to pass therethrough. Surrounding the cap 61, and spaced therefrom to form the insulating space 63, is a second larger glass cover or heat cap 64, which is apertured at 65 to permit the pipe 59 to pass therethrough. In the preferred form of the invention, the heat is above the seeds, and the glass covers permit the sun's rays to strike the sprouts as the seeds grow.

There has thus been provided a heating means that will prematurely heat seeds planted in close proximity thereto, to start germination of the seeds regardless of the prevailing weather conditions.

It is believed that from the foregoing description, the construction and operation of the invention will be apparent to those skilled in the art, and it is to be understood that changes in the minor details of construction, arrangement and combination of parts may be resorted to, provided they fall within the spirit of the invention and the scope of the appended claim.

Having thus described the invention, what is claimed as new and desired to be secured by Letters Patent is:

A device of the character described comprising an orbicular housing adapted to be embedded in the ground in close proximity to seeds planted therein, heating means within the housing and said heating means adapted to heat said housing so that the heat expelled by said housing will heat the ground in which the housing is embedded to prematurely start the germination of the seeds, said housing having a circular shaped opening therein for access to said heating means, a vent pipe formed integral with the housing centrally thereof and communicating with the housing, and extending upwardly from the housing outwardly of the ground, an inner semispherical shaped glass cover placed over the seeds on the ground and having an opening therein for the passage therethrough of said vent pipe, an outer semispherical shaped glass cover placed over said first cover and spaced therefrom to provide an insulated space between said covers, and said outer cover having an opening therein in line with the opening in the inner cover to permit the passage therethrough of said vent pipe and said covers holding the heat above the ground surface above the seeds and permitting rays of the sun to strike the ground above the seeds.

ANDREW HALLUM.

REFERENCES CITED

The following references are of record in the file of this patent:

UNITED STATES PATENTS

| Number | Name | Date |
|---|---|---|
| 810,835 | Austin | Jan. 23, 1906 |
| 894,211 | Kaump | July 28, 1908 |
| 1,297,853 | Insko | Mar. 18, 1919 |
| 1,315,375 | McCrea | Sept. 9, 1919 |

OTHER REFERENCES

Publication—Science and Invention—Sept. 1927, page 432, "Propagator."